Feb. 28, 1961 W. S. OAKES ET AL 2,973,473
TRANSCONDUCTANCE TEST CIRCUIT
Filed Aug. 12, 1957
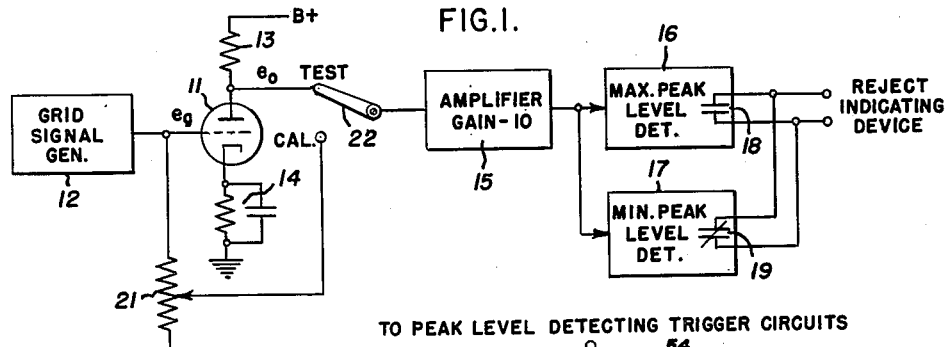
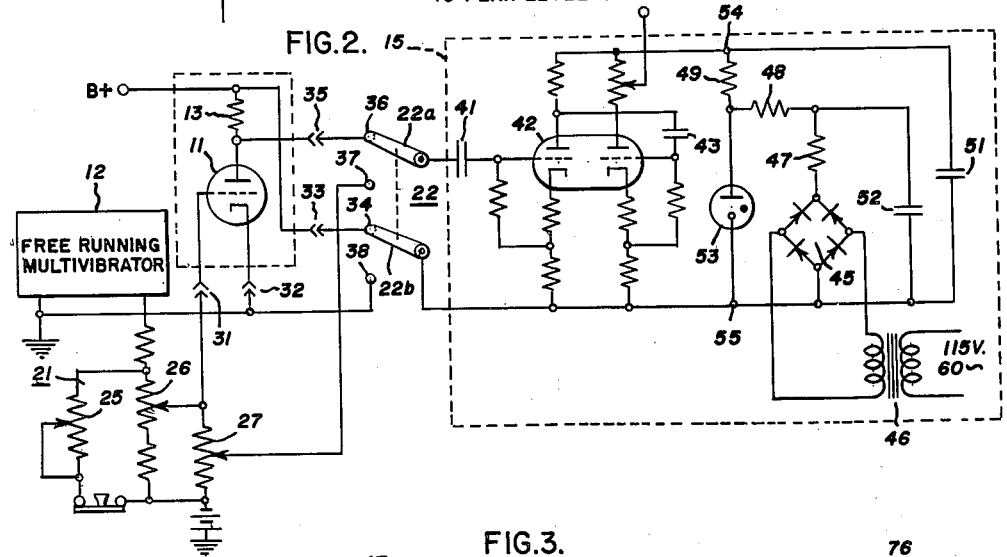
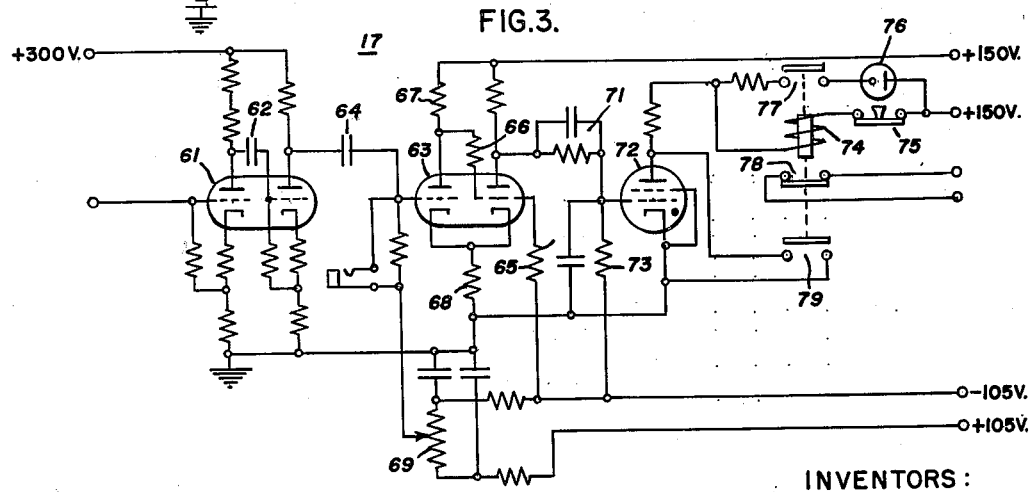
INVENTORS:
WILLIAM S. OAKES
SAMUEL C. BRISTOW,
BY Charles W. Helzer
THEIR ATTORNEY.

united States Patent Office 2,973,473
Patented Feb. 28, 1961

2,973,473
TRANSCONDUCTANCE TEST CIRCUIT

William S. Oakes, Pattersonville, N.Y., and Samuel C. Bristow, Owensboro, Ky., assignors to General Electric Company, a corporation of New York Filed Aug. 12, 1957, Ser. No. 677,456

8 Claims. (Cl. 324—26)

The present invention relates to a transconductance testing circuit for electron tubes.

More particularly, the invention relates to a testing circuit adapted to have an electron tube to be tested automatically switched into operating circuit relationship with the testing circuit for automatically testing the tubes for maximum and minimum transconductance values on a "go" "no-go" basis.

In the manufacture of electron tubes, it is necessary to perform several tests on newly manufactured tubes in order to determine the operating characteristics of the tubes. One of the characteristics of an electron tube which must be determined is its transconductance. The transconductance of an electron tube is defined as the ratio of the change in plate current flowing in the tube to the change in grid voltage with all biasing voltage being held constant. Transconductance is normally expressed as follows:

$$g_m = \frac{\partial i_p}{\partial e_g} \quad (1)$$

where $i_p$ is the plate current flowing in the tube, and $e_g$ is the grid voltage with all other voltages held constant. In the past, there has been no known single circuit capable of deriving an output signal or indication representative of the transconductance of the tube under test. Heretofore, transconductance measurements have usually required the reading of meters, or adjusting a bridge circuit to a null and then mentally comparing the results with specified maximum and minimum values. Because such mental comparisons necessarily slowed down production testing of the electron tubes, and offered opportunities for errors, a testing circuit capable of rapidly measuring the transconductance of electron tubes, and which could be readily incorporated into an automatic tube testing apparatus, was desired.

It is therefore one object of the present invention to provide a novel testing circuit capable of rapidly measuring the transconductance of electron tubes on a "go"-"no go" basis in a single testing operation.

Another object of the invention is to provide a novel transconductance measuring circuit which may be readily incorporated into an automatic tube testing apparatus, and provides a reliable indication on a "go"-"no go" basis of the transconductance characteristics of an electron tube under test.

In practicing the invention, an electron tube transconductance testing circuit is provided which comprises a source of constant peak amplitude alternating current grid signals that may be automatically switched into operating circuit relationship with the control grid of an electron tube under test. Also automatically switched into operating circuit relationship with the electron tube under test are sources of constant bias voltages for connection to the remaining electrodes of the tube. The novel transconductance testing circuit further includes a plate load resistor that is automatically switched into electric circuit relationship with the plate electrode of the tube under test, and that is small in resistance value in comparison to the plate resistance of the plate electrode of the tube. At least one peak level detecting trigger circuit is operatively coupled to the plate electrode of the electron tube under test, and is operative to provide an output trigger signal upon the peak amplitude of the alternating current signal supplied from the plate electrode of the tube under test to the trigger circuit exceeding some preselected value. Operatively coupled to the output of the trigger circuit is a reject relay for rejecting or otherwise indicating that the tube under test does not meet the transconductance requirements imposed by the testing circuit.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

Fig. 1 is a schematic block diagram of a novel transconductance testing circuit constructed in accordance with the invention;

Fig. 2 is a schematic circuit diagram of a portion of the transconductance testing circuit shown in Fig. 1, and illustrates the circuit construction of a calibrating potentiometer, and a coupling amplifier through which signals from the electron tube under test are coupled; and Fig. 3 is a schematic circuit diagram of a peak level detecting trigger circuit comprising a part of the transconductance testing circuit illustrated in Fig. 1.

The novel testing circuit illustrated schematically in Fig. 1 of the drawings is designed for testing the transconductance of an electron tube 11, and comprises a grid signal generator 12 having its output connected to the control grid of the electron tube 11. Signal generator 12 supplies a signal voltage to the tube under test which has a peak to peak amplitude of about 100 millivolts, and is square-wave in nature at a frequency of 300 to 400 cycles per second. The plate electrode of the electron tube 11 under test is connected to a source of positive biasing potential through a load resistor 13 selected to be of a value such that it is small in resistance value in comparison to the plate resistance of the electron tube 11. It has been determined that for most electron tubes, the load resistor 13 should have a value in the neighborhood of 100 ohms to obtain optimum results with the testing circuit. The cathode electrode of electron tube 11 may have a conventional biasing circuit 14 connected to it for providing the required operating bias voltages to the tube. The plate electrode of tube 11 is also connected to an amplifier 15 which in turn has its output connected in parallel to two peak level detecting trigger circuits 16 and 17 to be described more fully hereinafter. The peak level detecting trigger circuit 16 is adjusted to provide an output trigger signal upon the signal supplied from the plate electrode of the tube 11 under test exceeding some preselected maximum value, and has a normally open relay 18 connected in its output. The peak level detecting trigger circuit 17 is adjusted so that it provides an output trigger signal upon the signal supplied from the electron tube 11 under test exceeding some preselected minimum level, and it has a normally closed relay 19 connected in its output. The contact arrangement of relay 18 and relay 19 is connected to give a reject-actuating signal. A closed circuit indicates "no-go" and conversely, an open circuit indicates "go."

The transconductance testing circuit operates in the following manner to obtain a measure on a "go"-"no-go" basis of the transconductance of the electron tube 11 under test. It is stated as a condition of this test that the input voltage is held constant, and that all biasing voltages are fixed. By definition $$g_m = \frac{\partial i_p}{e_g} = \frac{\partial i_p}{e_g} \quad (2)$$

It follows then that $$i_p = g_m e_g \quad (3)$$

It also can be stated that where $e_o$ is defined as the output voltage of the electron tube 11 under test, then $$e_o = i_p R_L \quad (4)$$

Substituting in the last expression, the earlier expression for $i_p$, the following equation results $$e_o = g_m e_g R_L \quad (5)$$

In the test circuit under consideration, $e_g$ is the value of the signal supplied to the control grid of the electron tube 11, and is held constant at approximately $\frac{1}{10}$ of a volt peak to peak value, and $R_L$ has been specified to be 100 ohms plus or minus $\frac{1}{10}$ of 1%. Substituting these values in the last expression above, it can be shown that $$e_o = g_m \times 0.1 \times 100 = 10 g_m \quad (6)$$

From this last expression, it can be appreciated therefore that the output signal of the electron tube 11, where the plate load resistor 13 is relatively small in comparison of the plate resistance of the tube, is proportional to the transconductance of the tube. Hence this output voltage can be used as an actual measurement of the transconductance of the electron tube under test.

In order to properly relate the output signals derived from the maximum and minimum peak level detecting trigger circuits 16 and 17, to the transconductance characteristics of the electron tube 11 under test, it is necessary to calibrate these trigger circuits. For this purpose a calibrated potentiometer 21 having a dial reading from 0 to 1000 connected to the output of the grid signal generator 12 by a selector switch 22. From previous considerations, it has been shown that $$e_o = g_m e_g R_L \quad (7)$$

The voltage amplification of an electron tube is given by the expression $$A = \frac{e_o}{e_g} \quad (8)$$

Substituting the expression for $e_o$ in this last equation results in $$A = \frac{e_o}{e_g} = \frac{g_m e_g R_L}{e_g} = g_m R_L = 100 g_m \quad (9)$$

where $$R_L = 100 \text{ ohms} \quad (10)$$

This means that when the potentiometer tap of potentiometer 21 is set at its maximum reading 1000, which setting gives a calibrating voltage that corresponds to unity gain ($A=1$) for the electron tube under test, then the potentiometer 21 develops a voltage equivalent to an electron tube having a transconductance obtained from the expression $$A = 100 g_m = 1 \text{ or } g_m = \frac{1}{100} = 10,000 \times 10^{-6} \quad (11)$$

In other words, the potentiometer develops a voltage equivalent to an electron tube having a transconductance of 10,000 micromhos. Any other calibrating voltage may be obtained from the calibrating potentiometer 21 by merely dividing the desired equivalent transconductance by a factor of 10 to provide the required setting for the potentiometer 21. For example, if it is desired to obtain a calibrating voltage corresponding to a transconductance of 500 micromhos, it will be necessary to divide this desired transconductance by 10, and the required setting of the potentiometer 21, namely 50, is obtained. It should also be noted that the calibrating voltage is independent of the absolute value of the grid signal $e_g$, and that therefore a precise setting of the absolute value of $e_g$ is not necessary. Also, the whole operation of the testing circuit is predicated on the peak to peak value of the grid signal $e_g$ remaining constant, any long term drift of this peak to peak value of the signal voltage $e_g$ is easily compensated for by periodically recalibrating the peak level detecting trigger circuits as described above. From a practical standpoint therefore the accuracy of the testing circuit is dependent on the value of the load resistor $R_L$ which is 100 ohms plus or minus $\frac{1}{10}$ of 1%, and the linearity and dial accuracy of the potentiometer 21, both of which can easily be controlled to values of $\frac{1}{10}$ of 1% accuracy or better.

In order to provide the calibrating voltage from potentiometer 21 to both the maximum and minimum peak level detecting trigger circuits 16 and 17, selector switch 22 has its moveable contact connected to the input of amplifier 15, and one of the fixed contacts thereof connected to the potentiometer 21, and the other fixed contact connected to the plate electrode of the electron tube 11 under test. By this arrangement, it is possible periodically to supply a calibrating voltage from the calibrating potentiometer 21 to the peak level detecting trigger circuits to recalibrate the trigger circuits to compensate for long term drift in the peak to peak amplitude of the grid signal generator output signal, and other such undesired variations.

Upon placing the transconductance testing circuit in operation, the selector switch 22 is moved to the calibrate contact, and the potentiometer 21 is adjusted to provide an output signal representative of the signal obtained from a tube under test having a minimum acceptable transconductance. This calibration signal is supplied through amplifier 15 to the minimum peak level detecting trigger circuit 19 which is then adjusted to provide an output trigger signal upon receipt of an input signal that exceeds the calibration signal. Next, the moving contact on potentiometer 21 is moved to a position to provide a calibration signal representative of the maximum transconductance desired from an electron tube 11 under test. This maximum calibration signal is then supplied through the amplifier 15 to the maximum peak level detector which is adjusted accordingly to provide an output trigger signal upon receipt of an input signal exceeding the calibration signal. In this manner, the maximum and minimum peak level detecting trigger circuits are properly calibrated independently of the absolute amplitude of the grid signal supplied by the grid signal generator 12.

After calibration of the testing circuit, the selector switch 22 is moved to the test contact connected to the plate electrode of the electron tube under test. The grid signal supplied to the control grid of an electron tube 11 under test by the grid signal generator produces across the load resistor 13 an electric output signal $e_o$ which is proportional to the transconductance of the tube as previously proven. This output electric signal $e_o$ is amplified by amplifier 15, and supplied to both a minimum and maximum peak level detecting trigger circuit 16 and 17, respectively. In the event that the output signal $e_o$ does not lie within an acceptable range of transconductance values, either of the trigger circuits 16 or 17 will be actuated. Maximum peak level trigger circuit 16 will be actuated in the event the transconductance of the tube under test exceeds the maximum acceptable value, and will operate to close a normally open relay 18 connected to its output. In the event the transconductance of the tube under test does not attain the minimum acceptable value, the minimum peak level detecting trigger circuit 17 will not be rendered operative to provide an output electric trigger signal capable of opening a normally closed reject relay 19. Hence, in either of the above-mentioned events, the tube under test would be rejected by the reject relay circuit.

As shown in Fig. 2 of the drawing, the potentiometer 21 preferably comprises three variable resistors 25, 26, and 27 connected in parallel circuit relationship. This bank of parallel connected variable resistors has one of its terminals connected directly to ground, and the other terminal connected through a voltage dropping resistor 29 to the output of multivibrator 12. The resistor 29 is connected by a cathode follower amplifier (not shown) to the output stage of the free-running multivibrator 12, and the ungrounded terminal of the variable resistor 27 is connected directly to the control grid of the electron tube 11 under test so that in effect the free-running multivibrator 12 is coupled to the control grid of the electron tube 11 by a cathode follower amplifier stage (not shown). The ungrounded terminal of variable resistor 27 is connected to the control grid of the electron tube 11 through a sliding switch 31 which may comprise an insulated contact that is secured to a rotatable turntable on which the electron tube 11 is supported in a tube receiving socket, and that cooperates with a wiper-arm contact connected to the ungrounded terminal of variable resistor 27. The electron tube 11 under test also has a cathode biasing circuit 14 connected to the cathode electrode thereof, and connected to ground through a sliding switch arrangement 32 similar to sliding switch 31. The plate electrode of electron tube 11 is connected through a 100 ohm load resistor 13 to a suitable source of plate biasing potential. The plate load resistor 13 is also connected through a sliding switch arrangement 33 to a fixed contact 34 comprising a part of selector switch 22a, 22b for a purpose to be described hereinafter.

The movable contact 22a of selector switch 22 is connected through a coupling capacitor 41 to the control grid of an electron discharge tube 42. Electron discharge tube 42 comprises a duo-triode having the plate electrode of the first triode stage thereof coupled through a coupling capacitor 43 to the control grid electrode of the second triode stage. Both triode stages have suitable cathode biasing resistors connected in the cathode circuits thereof, and plate load resistors connected to each of plate electrodes thereof so that the duo-triode operates as a conventional two-stage resistance-capacitance coupled amplifier in every respect except one. The resistance-capacitance coupled amplifier formed by the duo-triode 42 differs from conventional resistance-capacitance coupled amplifiers in that it has a floating power supply with respect to the electron tube 11 under test. This floating power supply is formed by a bridge rectifier circuit 45 having two diagonally opposed terminals connected across the output winding of an input transformer 46 supplied from a conventional 115 volt, 60 cycle alternating current power supply. The remaining diagonally opposed terminals of the rectifier bridge 45 are connected to a plurality of resistors 47, 48, and 49, which together with by-pass capacitors 51 and 52, and neon tube 53 constitute a filter circuit for the rectifier bridge to form a direct current power supply. This direct current power supply has its output terminal 54 and 55 connected across the plate electrode and cathode electrode of the duo-triode tube 42. The terminal 55 of the direct current power supply is also connected through the arm 22b of selector switch 22, to the fixed contact 34 of selector switch 22, and therefore to the plate electrode of the tube 11 through load resistor 13. By connecting the direct current power supply to the plate electrode of the tube 11 under test in this manner, the power supply for the amplifier formed by duo-triode 42 is referenced to the plate supply voltage of the electron tube 11 under test. Hence, the amplifier power supply will not reflect any undesired impedance into the reading obtained across the plate load resistor 13 and thereby eliminates the effect of the power supply impedance which could cause an erroneous reading of the transconductance value of the tube under test.

The circuit arrangement illustrated in Fig. 2 of the drawings operates in the manner described with relation to the schematic block diagram shown in Fig. 1. It might be noted, however, that the output signal obtained from the resistance-capacitance coupled amplifier formed by the duo-triode tube 42 is obtained from the plate load resistor of the second triode stage of duo-triode 42.

The output signal from amplifier 15 is supplied in parallel to the input of both the maximum peak level detecting trigger circuit 16, and the minimum peak level detecting trigger circuit 17. Because both of these trigger circuits are essentially identical in construction, and differ only in the adjustments of the circuits so that one operates as a maximum peak level detector, and the other operates as a minimum peak level detector, it is believed necessary to disclose the details of the construction of only one of the circuits. Fig. 3 therefore shows the details of construction of the minimum peak level detecting trigger circuit 17, and preferably includes a two-stage resistance-capacitance coupled amplifier formed by a duo-triode 61 having the control grid electrode of the first triode stage thereof connected to the output of amplifier 15. The plate electrode of the first triode stage of duo-triode 61 is coupled through a coupling capacitor 62 to the control grid electrode of the second stage triode. This coupling capacitor 62 together with conventional resistors, and cathode biasing resistors cause the duo-triode 62 to function as a conventional two-stage resistance-capacitance coupled amplifier. Because the two-stage amplifier formed by duo-triode 61 operates in a conventional fashion to amplify the alternating current electric signal supplied thereto by amplifier 15, it will not be described in great detail. However, for a description of a two-stage resistance-capacitance coupled amplifier that is satisfactory for use in the circuits illustrated, reference is made to any of the standard text books on electronic circuitry. For example, one of the amplifiers described in the text book entitled "Applied Electronics" published by the Technology Press, Massachusetts Institute of Technology, Cambridge, Massachusetts, 1943, would be satisfactory.

The peak level detecting trigger circuit 17 further comprises a cathode coupled multivibrator formed by a duo-triode 63 having the control grid electrode of the first triode stage thereof coupled to the amplifier 61 by a coupling capacitor 64. For a more detailed description of the construction and operation of suitable cathode coupled, one-shot multivibrator circuits that are satisfactory for use in the peak level detecting trigger circuits, reference is made to any of the standard text books concerning circuits of this nature. One such satisfactory circuit is disclosed in the text book entitled "Principles of Radar" produced by the MIT Radar School Staff, 3rd Edition, Reinjet and Coate, authors, published by the McGraw-Hill Book Company. Briefly, however, the one-shot multivibrator formed by duo-triode 63 operates in the following manner. A cutoff bias voltage is supplied to the control grid electrode of the second stage triode of duo-triode 63 by a voltage dividing network comprising resistors 65, 66, and 67. The resistor 67 also constitutes the plate load resistor of the first stage triode of duo-triode 63. The bias voltage supplied from this voltage dividing network is adjusted so that the second stage triode of duo-triode 63 is normally conductive. Conduction of this second stage triode develops a positive bias across a common cathode load resistor 68, which in conjunction with a negative bias voltage supplied to the control grid electrode of the first triode stage of duo-triode 63 from a voltage divider 69, serves to maintain the first stage triode of duo-triode 63 in the cutoff condition. The output signal from the two-stage amplifier formed by duo-triode 61 is coupled to the control grid electrode of the first stage triode of duo-triode 63, and when its peak to peak value exceeds the value of the cutoff bias voltage supplied to the first triode stage of duo-triode 63, which cutoff bias voltage is set to correspond to the lower limit of the allowable transconductance of the electron tube 11 under test, the first triode stage of duo-triode 63 is rendered conductive. Conduction of the first stage triode of duo-triode 63 causes the second stage triode to be cut off by reason of the bias developed across the common cathode resistor 68, and causes a positive going signal pulse to be developed in its plate circuits.

The positive going signal pulse developed in the plate circuit of the second stage triode of duo-triode 63 is preferably coupled through a resistance-capacitance coupling network 71 to the control grid electrode of a grid control gas discharge device comprising a thyratron tube 72. Thyratron tube 72 also has its control grid coupled through a voltage dropping resistor 73 to a source of negative biasing potential. This negative biasing potential maintains thyratron tube 72 in a normally non-conductive condition. Upon the application of a positive going signal pulse from the output of the one-shot multivibrator 63, however, the negative bias voltage supplied to the control grid of thyratron tube 72 is overcome, and the tube is rendered conductive.

Thyratron tube 72 has a reject relay 74 connected in its plate circuit together with a reset switch 75, and, if desired, a neon light indicator 76 together with a by-pass switch 77 may also be connected in parallel with relay 74. The relay reset switch 75 is normally closed so that upon thyratron tube 72 being rendered conductive, the normally closed switch contacts 78 of the relay 74 are opened, thereby inactivating a circuit which otherwise would actuate a reject indicator, or some reject mechanism for rejecting the tube 11 under test from the socket in which it is seated. If desired, relay 74 may also actuate a normally open switch 79 connected in a by-pass circuit around thyratron tube 72 so as to minimize wear of the thyratron.

Having described the construction of the trigger circuit 17, briefly, it operates in the following manner. Any current supplied from the plate electrode of the electron tube 11 under test to the plate load resistor, which has a value in the neighborhood of 100 ohms, is proportional to the transconductance of the tube under test as previously established. The peak amplitude of this signal, which is an alternating current signal in nature, is compared to the value of the negative control grid bias voltage supplied to the control grid of the first stage triode of duo-triode 63 by potentiometer 69, and if it is sufficiently great to overcome this negative bias voltage, the first stage triode of duo-triode 63 is rendered conductive. This results in cutting off the second stage triode of duo-triode 63, and supplies a positive going trigger pulse to the control grid of thyratron 72. Accordingly, it can be appreciated that by proper adjustment of the negative grid bias voltage supplied by the potentiometer 69 to the control grid of the first stage triode of duo-triode 63, the trigger circuit 17 can be made to accommodate any desired value of transconductance, and that the setting thus proportioned causes the trigger circuit to accept or reject electron tubes under test on a "go"-"no go" basis. Accordingly, where it is desired to test an electron tube for minimum transconductance, the level of the bias potential supplied from the potentiometer 69 is adjusted accordingly. Also, it is necessary that the relay connected in the output of the thyratron 72 have normally closed contacts so that in the event the transconductance of the tube under test does not exceed the preselected minimum value, the rejection circuit controlled by the relay will continue to be operative to reject the electron tube under test. In the event the transconductance of the tube under test does exceed the preselected minimum value, the relay will be opened, thereby rendering the reject circuit inoperative, and allowing the electron tube under test 11 to pass the inspection. In the event that it is desired to use the circuit as a maximum peak level detector 16, the negative bias potential supplied from the potentiometer 69 is adjusted accordingly. Where the circuit is used as a maximum peak level detector, however, a normally open relay is used in the output of the rejection thyratron 72. By this construction, should the transconductance of an electron tube under test exceed the maximum acceptable transconductance value, the relay will be actuated to close the rejection circuit thereby rejecting the tube under test. However, in the event the transconductance of the tube under test does lie within the accepted maximum value, the rejection relay will not be actuated, and the tube will be passed.

From the foregoing description it can be appreciated that the novel transconductance testing circuit described herein is entirely automatic in operation, and is capable of performing a transconductance test on a number of electron tubes at a relatively rapid rate. Further, it can be appreciated that the circuit is capable of ready incorporation into an automatic tube testing apparatus.

In constructing the new and improved transconductance testing circuit illustrated in the several drawings, the value of the circuit parameters are generally those illustrated in the drawings; however, it can be appreciated that many of these parameters can be varied in value without substantially affecting the operation of the novel testing circuit. Additionally, it is believed obvious that other modifications and variations of the specific embodiment of the novel transconductance testing circuit illustrated, are possible in the light of the above teachings. It is therefore to be understood that chanegs may be made in the particular embodiment of the invention disclosed which are within the full intended scope of the invention as defined by the appended claims.

What we claim as new and desire to secure by Letters Patent of the United States is:

1. An electron tube transconductance testing circuit comprising a source of constant peak amplitude alternating current control grid signals adapted to be operatively coupled to the control grid of an electron tube under test, means providing constant bias voltages adapted to be supplied to the other electrodes thereof, said control grid signal source providing a low impedance to negative grid currents in the tube under test, a plate load resistor adapted to be connected to the plate electrode of the tube under test which is small in resistance value in comparison to the plate resistance of the tube under test, at least one peak level detecting trigger circuit operatively adapted to be coupled to the plate electrode of the electron tube under test, said triggr circuit being operative to provide an output trigger signal when the peak amplitude of the alternating current signal developed in the plate electrode of the electron tube under test falls below some preselected value, means for manually adjusting said pre-selected value and a reject relay operatively coupled in the output circuit of said trigger circuit.

2. The combination set forth in claim 1 further characterized by a calibrating potentiometer operatively coupled to the source of alternating grid signals for developing signals having a desired fractional amplitude of said grid signals, and a switching circuit for selectively connecting said peak level detecting trigger circuit to said calibrating potentiometer or to the plate electrode of the electron tube under test for providing a calibrating signal to said peak level detecting trigger circuit.

3. The combination set forth in claim 1 wherein there are two peak level detecting trigger circuits operatively coupled to the plate electrode of the electron tube under test, one of the trigger circuits being operative to provide an output trigger signal upon the peak amplitude of the alternating current signal supplied from the plate electrode of the tube under test falling below some preselected minimum value, and the remaining trigger circuit being operative to provide an output trigger signal upon the peak amplitude of the alternating current signal supplied from the plate electrode of the tube under test exceeding some preselected maximum values, manual means for adjusting said preselected maximum and minimum values, a first reject relay operatively coupled to the output of said minimum peak level detecting trigger circuit, and a second reject relay operatively coupled to the output of said maximum peak level detecting trigger circuit.

4. The combination set forth in claim 1 wherein there are two peak level detecting trigger circuits operatively coupled to the plate electrode of the electron tube under test, one of the trigger circuits being operative to provide an output trigger signal upon the peak amplitude of the alternating current signal supplied from the plate electrode of the tube under test falling below some preselected minimum value, and the remaining trigger circuit being operative to provide an output trigger signal upon the peak amplitude of the alternating current signal supplied from the plate electrode of the tube under test exceeding some preselected maximum values, a normally closed reject relay operatively coupled to the output of said minimum peak level detecting trigger circuit, and a normally open reject relay operatively coupled to the output of said maximum peak level detecting trigger circuit, and wherein the combination is further characterized by a calibrating potentiometer operatively coupled to the source of alternating grid signals, and a switching circuit for selectively connecting said peak level detecting trigger circuit to said calibrating potentiometer or to the plate electrode of the electron tube under test for providing a calibrating signal to said peak level detecting trigger circuits.

5. In an electron tube transconductance testing circuit adapted to be automatically switched into electric circuit relationship with an electron tube under test seated in a socket supported on an indexing mechanism for sequentially indexing a plurality of such electron tube sockets into and out of working relationship with the testing circuit, the combination comprising a free-running multivibrator for generating a constant peak amplitude square-wave grid signal, a cathode follower amplifier having the input thereof coupled to the output of said multivibrator and having the output thereof coupled to the control grid of the electron tube under test, a load resistor connected to the plate electrode of the electron tube under test having a resistance-value of approximately one hundred ohms, at least one peak level detecting trigger circuit operatively coupled to the plate electrode of the tube under test, said trigger circuit comprising a two-stage resistance-capacitance coupled amplifier having its output connected to a separately biased one-shot multivibrator having its output stage normally biased to a cutoff condition but which is rendered operative to provide an output trigger signal upon an alternating current signal being supplied thereto by said two-stage amplifier having a peak amplitude greater than a predetermined value, a grid controlled gas discharge device having the control grid thereof coupled to the ouput of said one-shot multivibrator, and a reject relay connected in the output circuit of said gas discharge device.

6. The combination set forth in claim 5 further characterized by a calibrating potentiometer operatively coupled to the source of alternating grid signals, and a switching circuit for selectively connecting said peak level detecting trigger circuit to said calibrating potentiometer or to the plate electrode of the electron tube under test for providing a calibrating signal to said peak level detecting trigger circuit.

7. The combination set forth in claim 5 wherein there are two peak level detecting trigger circuits operatively coupled to the plate electrode of the electron tube under test, one of the trigger circuits being operative to provide an output trigger signal upon the peak amplitude of the alternating current signal supplied from the plate electrode of the tube under test exceeding some preselected minimum value, and the remaining trigger circuit being operative to provide an output trigger signal upon the peak amplitude of the alternating current signal supplied from the plate electrode of the tube under test exceeding some preselected maximum values, a normally closed reject relay operatively coupled to the output of said minimum peak level detecting trigger circuit, and a normally open reject relay operatively coupled to the output of said maximum peak level detecting trigger circuit.

8. The combination set forth in claim 5 wherein there are two peak level detecting trigger circuits operatively coupled to the plate electrode of the electron tube under test, one of the trigger circuits being operative to provide an output trigger signal upon the peak amplitude of the alternating current signal supplied from the plate electrode of the tube under test exceeding some preselected minimum value, and the remaining trigger circuit being operative to provide an output trigger signal upon the peak amplitude of the alternating current signal supplied from the plate electrode of the tube under test exceeding some preselected maximum values, a normally closed reject relay operatively coupled to the output of said minimum peak level detecting trigger circuit, and a normally open reject relay operatively coupled to the output of said maximum peak level detecting trigger circuit, and wherein the combination is further characterized by a calibrating potentiometer operatively coupled to the source of alternating grid signals, and a switching circuit for selectively connecting said peak level detecting trigger circuit to said calibrating potentiometer or to the plate electrode of the electron tube under test for providing a calibrating signal to said peak level detecting trigger circuit.

References Cited in the file of this patent

UNITED STATES PATENTS

| | | |
|---|---|---|
| 1,808,013 | Barnhart | June 2, 1931 |
| 2,443,794 | MacNichol | June 22, 1948 |
| 2,632,040 | Rabinow | Mar. 17, 1953 |
| 2,822,518 | Jordan | Feb. 4, 1958 |
| 2,873,424 | Lowery | Feb. 10, 1959 |